United States Patent
Wu et al.

(10) Patent No.: US 8,240,210 B2
(45) Date of Patent: Aug. 14, 2012

(54) METHOD AND SYSTEM FOR MULTIMODAL INSPECTION WITH A COORDINATE MEASURING DEVICE

(75) Inventors: Yanyan Wu, Schenectady, NY (US); Dean Michael Robinson, Schenectady, NY (US); Shridhar Nath, Niskayuna, NY (US); Nicholas Joseph Kray, Blue Ash, OH (US)

(73) Assignee: General Electric Company, Niskayuna, NY (US)

( * ) Notice: Subject to any disclaimer, the term of this patent is extended or adjusted under 35 U.S.C. 154(b) by 721 days.

(21) Appl. No.: 12/372,853

(22) Filed: Feb. 18, 2009

(65) Prior Publication Data

US 2010/0205816 A1  Aug. 19, 2010

(51) Int. Cl.
  *G01N 29/265* (2006.01)
  *G01N 27/90* (2006.01)
(52) U.S. Cl. .......................... 73/601; 73/619
(58) Field of Classification Search ............ 73/618–619, 73/601
  See application file for complete search history.

(56) References Cited

U.S. PATENT DOCUMENTS

| | | | |
|---|---|---|---|
| 4,167,878 A * | 9/1979 | Bottcher et al. ............ | 73/601 |
| 4,713,892 A | 12/1987 | Strauss | |
| 4,745,809 A * | 5/1988 | Collins et al. ............... | 73/661 |
| 4,856,337 A * | 8/1989 | Metala et al. ............... | 73/601 |
| 4,977,853 A * | 12/1990 | Falcoff et al. ............... | 118/665 |
| 5,475,613 A * | 12/1995 | Itoga et al. .................. | 702/39 |
| 6,504,363 B1* | 1/2003 | Dogaru et al. ............. | 324/235 |
| 7,797,849 B2* | 9/2010 | Gomez et al. .............. | 33/503 |
| 7,840,367 B2* | 11/2010 | Little et al. ................. | 702/95 |
| 7,921,575 B2* | 4/2011 | Little et al. ................. | 33/503 |
| 8,010,315 B2* | 8/2011 | Wu et al. .................... | 702/152 |
| 2002/0128790 A1 | 9/2002 | Woodmansee | |
| 2005/0151963 A1 | 7/2005 | Pulla et al. | |
| 2010/0207619 A1* | 8/2010 | Wu et al. .................... | 324/238 |

\* cited by examiner

*Primary Examiner* — Hezron E Williams
*Assistant Examiner* — Rose M Miller
(74) *Attorney, Agent, or Firm* — Penny A. Clarke

(57) ABSTRACT

A method for integrating a measurement device for use in measuring a machine component includes providing a coordinate measuring device, such as a coordinate measuring machine (CMM), and integrating with a plurality of nondestructive examination (NDE) capabilities with a plurality of coordinate measuring device capabilities to form an inspection probe. The method further includes integrating the NDE inspection probe with the coordinate measuring device such that the inspection probe substantially simultaneously measures a plurality of NDE measurements and external/internal geometry and defects of machine component, which are linked to actual component dimensional information provided by CMM. The inspection data can be simultaneously linked to and/or displayed together with a CAD model to enable a direct comparison between the inspection data and the nominal requirements carried on the CAD model.

12 Claims, 2 Drawing Sheets

METHOD AND SYSTEM FOR MULTIMODAL INSPECTION WITH A COORDINATE MEASURING DEVICE

BACKGROUND OF THE INVENTION

The field of the present invention relates generally to measurement probes, and more specifically, to a method of integrating a multimodal measurement probe for use in measuring a machine component and a system for inspection comprising such an integrated probe.

Prior to being placed in service, at least some known rotor blades or other components having an internal geometry or having narrow openings are measured using measurement probes to ensure that that the blade has the proper dimensions for use in a turbine engine. Often, such blades are inspected via a non-destructive inspection technique to ensure that each blade does not include internal/external defects and/or cracks that may not be visible to the naked eye. Generally, it is important to measure both the external and internal geometry and structure of the blade. A coordinate measuring machine can only conduct external geometry measurements and can not inspect wall thickness and any internal structure/defects of a part.

Coordinate measuring machines (CMMs) have been used for external dimensional measurement. Nondestructive examination (NDE) sensors including ultrasound (UT) sensors, eddy current (EC) sensors, etc., have been used separately to determine a thickness, internal defects, or surface condition measurements without being linked to the three-dimensional geometry of the component under inspection.

Known methods for measuring a blade generally require several separate processes to inspect both the internal and external geometry of the blade. In one process, at least some known blades are inspected using computed tomography (CT) and/or ultrasonic (UT) to inspect the internal geometry of the blade. A coordinate measuring device, such as a coordinate measuring machine (CMM) probe or a laser scanner on a CMM, is separately used to inspect the external geometry of the blade. Accordingly, a significant amount of time may be required to complete the setup and inspection process for each individual process of CT, CMM, and/or UT. Moreover, UT inspection currently requires a motion control system and, therefore, requires a pre-inspection process to program the motion control system to accurately follow the contour of the blade.

Accordingly, such known inspection methods are generally time-consuming, not suitable for in-situ inspection, and/or expensive. Further, for CMM, complicated blade geometry, such as a component having a deep, narrow opening or cavity, generally requires complicated setups and/or bending of the CMM probes to measure the cavity geometry. Moreover, for a compressor blade, the CMM probe must travel across both the pressure and suction sides of the blade. In addition, the CMM probe must compensate for the curvature deviation from CAD models. However, probe compensation is generally a computationally complicated process. Meanwhile, the CMM touch probe requires a detailed CAD model to conduct dimensional measurement, which might not be available all the time. Moreover, different sensors have different strengths. For example, a CMM touch probe has a higher accuracy, even on small features, but is generally slow, while a laser probe or a proximity sensor is non-contact and can measure quickly, but typically with a much lower accuracy. Similarly, a UT sensor can detect deep cracks, while an EC sensor can identify fine/shallow surface cracks. Moreover, infrared (IR) is good for measuring thin walls with a high speed, while an X-ray CT can provide a thicker-wall-thickness measurement. However, the defects and real geometry of a part are usually unknown prior to inspection. An intelligent probe should be able to conduct adaptive inspection at real-time, based on the real-time measurement data from sensors, and to optimize the usage of sensors based on the real geometry and defect types obtained on the fly.

BRIEF DESCRIPTION OF THE INVENTION

In one aspect, a method is provided for integrating a measurement device for use in measuring a machine component on a coordinate measuring device, such as a coordinate measuring machine (CMM), a motion control system, a CMM arm, and/or a robot. The method includes providing a coordinate measuring machine (CMM), or other type of motion control device, and combining a plurality of nondestructive examination (NDE) capabilities with a plurality of CMM capabilities to form an inspection probe. The method further includes integrating the inspection probes to the CMM such that the inspection probe substantially simultaneously measures a plurality of NDE measurements and external boundaries of machine component with the CMM capabilities.

In another aspect, a measurement device is provided that includes a coordinate measuring machine (CMM) and an inspection probe that combines a plurality of nondestructive examination (NDE) capabilities with a plurality of CMM capabilities. The inspection probe is coupled to the CMM such that the inspection probe is configured to measure external boundaries of a machine component with the CMM capabilities and to substantially simultaneously measure a plurality of NDE measurements using the NDE capabilities.

In yet another aspect, a system for measuring a machine component is provided. The system includes a measurement device. The measurement device includes a coordinate measuring machine (CMM) and an inspection probe that combines a plurality of NDE capabilities with a plurality of CMM capabilities. The inspection probe is coupled to the CMM such that the inspection probe measures external boundaries of a machine component with the CMM capabilities, and substantially simultaneously measures a plurality of NDE measurements of the machine component with the plurality of NDE capabilities. The system also includes a data process and control system that processes data from multiple sensors and provides adaptive control to facilitate optimizing the usage of the multiple sensors. The system further includes a display coupled to the measurement device to facilitate displaying measurements of the machine component.

Many known NDE sensors require a particular orientation and/or position with respect to a part under examination to ensure accurate measurements. It will be seen that combining multiple NDE sensors together with CMM capabilities through on-machine, multimodal data fusion, real-time closed loop sensor optimization can provide geometry information and defect information that can guide NDE sensors for higher-accuracy measurements, and use NDE sensors to improve dimensional measurement accuracy.

DETAILED DESCRIPTION OF THE INVENTION

In one embodiment, a system for measuring a machine component such as, but not limited to, a blade is provided. In the exemplary embodiment, the system includes a probe for measuring the machine component and a display for displaying measurements of the machine component, with or without displaying a CAD model. The measurement probe integrates a coordinate measuring machine (CMM) probe with a plurality of NDE probes, which may, for example, include a UT probe and an EC probe. The measurement probe can also be designed to eliminate some of the probes without sacrificing the measurement capability that possessed by the eliminated probe. For example, when CMM and UT probes are integrated, the CMM probe can be eliminated by using a customized UT probe to conduct the dimensional measurement. The UT probe measures a position of at least one internal defect, such as a crack, within a part or component, and represents a position of each internal defect with location and dimensional information determined by the CMM system. The EC probe may be simultaneously used to measure any surface defect and represents a position of each surface defect with location and dimensional information determined by the CMM system. In each embodiment, the measurement probe combines the capabilities of a plurality of NDE probes and of CMM inspection.

In one embodiment, the measurement probe simultaneously measures a geometry of at least two sides of the machine component by placing the measurement probe in contact with one of the at least two sides of the component. In another embodiment, a customized ultrasonic probe measures a surface that is substantially normal to the machine component. In the exemplary embodiment, the measurement probe measures a geometry, internal wall thickness, and internal structures/defects of a rotor blade.

It should be noted that although the present invention is described only with respect to rotor blades, one of ordinary skill in the art should understand that the present invention is not limited to being used only with rotor blades. Rather, the present invention may be used to measure any machine component. The rotor blade is used as an example herein because such blades have complex shapes and are often subject to critical inspections. For example, although a coordinate measuring machine is illustrated in FIG. 2 as including a CMM arm, one of ordinary skill in the art would recognize that the present invention is not limited to only being used with a coordinate measuring machine including a CMM arm.

Figure 1:
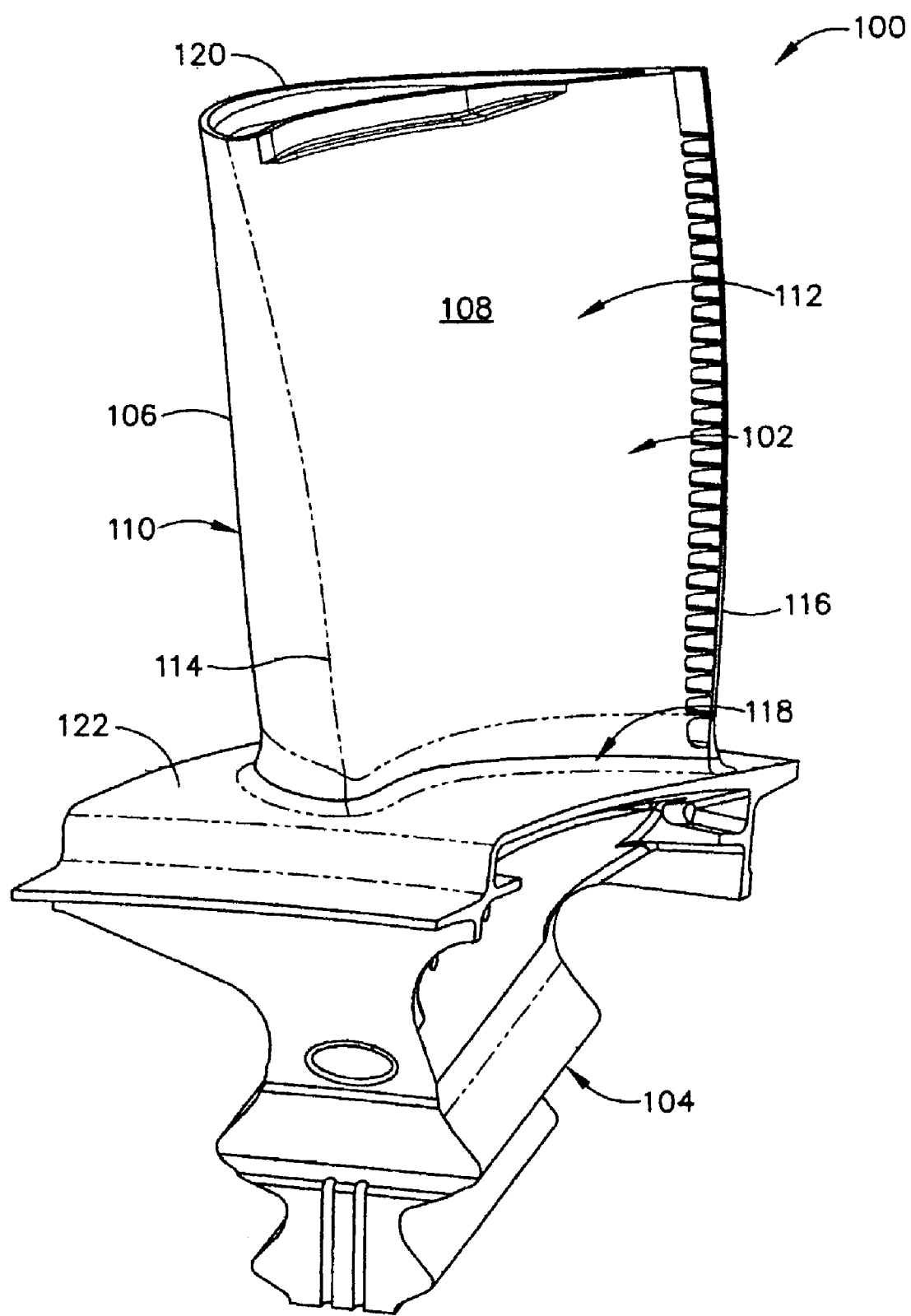
FIG. 1 is an exemplary embodiment of a turbine engine rotor blade.

FIG. 1 is an exemplary embodiment of a turbine engine rotor blade 100. Blade 100 includes an airfoil 102 and an integral dovetail 104 that is used for mounting blade 100 to a rotor (not shown). Blade 100 includes a first contoured sidewall 106 and a second contoured sidewall 108. In the exemplary embodiment, first sidewall 106 is convex and defines a suction side 110 of blade 100, and second sidewall 108 is concave and defines a pressure side 112 of blade 100. Sidewalls 106 and 108 are joined together at a leading edge 114 and at an axially-spaced trailing edge 116 of blade 100. More specifically, airfoil trailing edge 116 is spaced chordwise and downstream from airfoil leading edge 114. First and second sidewalls 106 and 108, respectively, extend longitudinally or radially outward in span from a blade root 118 positioned adjacent dovetail 104, to an airfoil or blade tip 120. A dovetail platform 122 is positioned at blade root 118 and extends radially outward from first and second sidewalls 106 and 108, respectively. It should be noted that blade 100 is exemplary only and the general configuration of blade 100 may take any conventional form, with or without platform 122 or dovetail 104. For example, blade 100 may be formed integrally with a disk in a blisk-type configuration that does not include dovetail 104.

Prior to installing blade 100 within an engine (not shown), and/or during maintenance of the engine, blade 100 is typically inspected using a measurement probe (not shown in FIG. 1) to ensure that that blade 100 is fabricated for and includes the proper dimensions for use in the engine. Further, blade 100 is inspected to ensure that blade 100 does not include internal and/or external defects. Accordingly, during this inspection, it is important to measure both the external and internal geometry of the blade.

Figure 2:
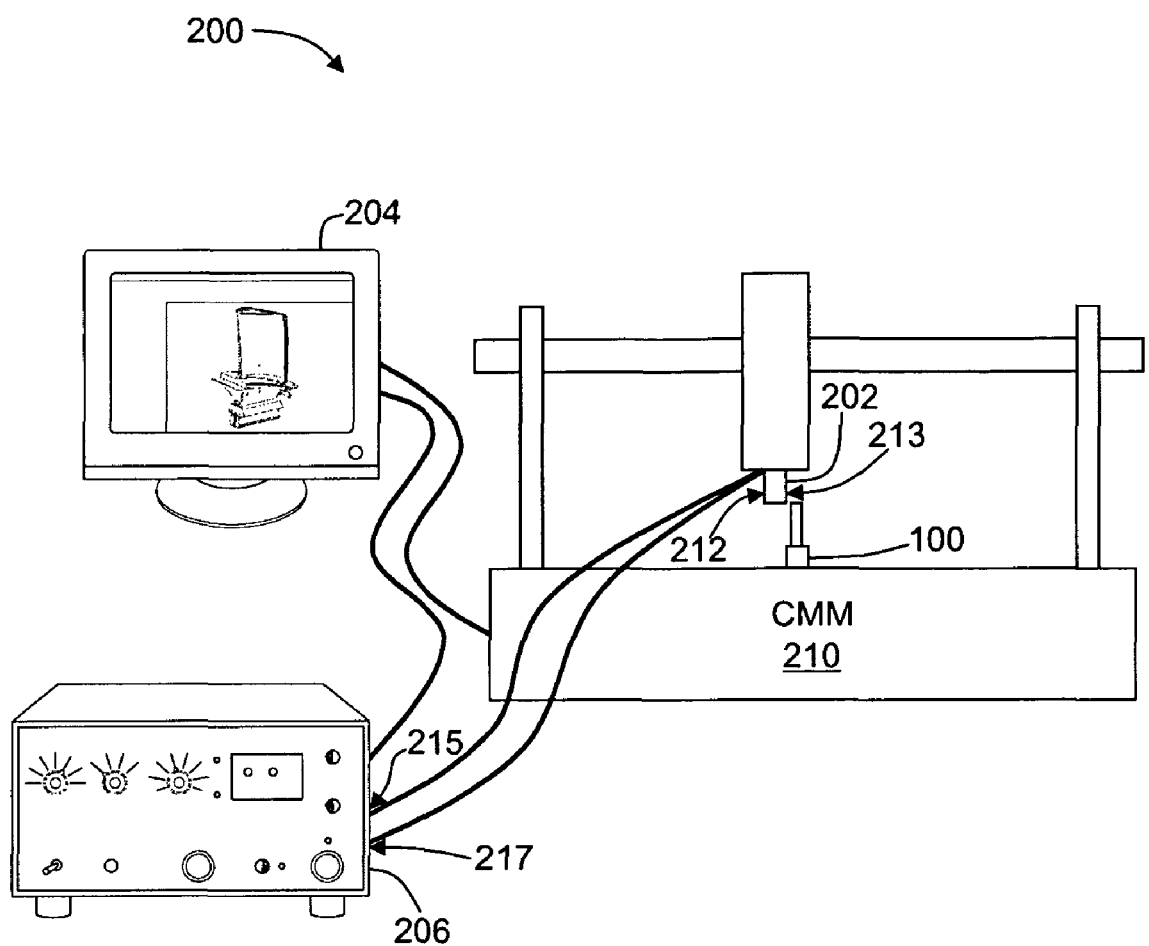
FIG. 2 is an illustration of an exemplary system that may be used to measure the rotor blade shown in FIG. 1.

FIG. 2 is an illustration of an exemplary system 200 that may be used to measure blade 100. In the exemplary embodiment, system 200 includes a measurement probe 202, a display 204, and a receiving apparatus 206. Further, in the exemplary embodiment, measurement probe 202 includes a coordinate measuring machine (CMM) 210 and a plurality of NDE sensors, such as, but not limited to, a UT probe 212 and/or an EC probe 213. UT probe 212 is integrated with a CMM probe (not shown) such that CMM probe 214 and UT probe 212 can measure, substantially simultaneously, the same location, or substantially the same location relative to blade 100. Similarly, EC probe 213 is integrated with a CMM probe such that the CMM probe and EC probe 213 can also measure, substantially simultaneously, the same location, or substantially the same location relative to blade 100. Meanwhile, multiple NDE probes can measure, substantially simultaneously, the same location, or substantially the same location relative to blade 100, such as the simultaneous measurement of a UT probe and a proximity sensor. Although the exemplary embodiment is described with respect to measurement probe 202 including a UT probe 212 and an EC probe 213 integrated with a CMM probe, alternatively measurement probe 202 may be customized to include a plurality of NDE sensors that are not necessarily of the same type as the exemplary embodiment described herein. In addition, measurement probe 202 may comprise a plurality of NDE sensors installed on CMM machine 210 that have both NDE capabilities and CMM capabilities, without physically coupling the plurality of NDE probes to a CMM probe. In each embodiment, measurement probe 202 combines the capabilities of a plurality of NDE inspection probes and of CMM inspection. Moreover, in the exemplary embodiment, each component of system 200 is electrically coupled to a computer (not shown) and/or data receiver/processor (not shown) and/or a controller.

In one embodiment, an adaptor (not shown) is used to integrate UT/EC with CMM. In such an embodiment, the adaptor has a mechanical and electrical circuit interface that enables coupling with a CMM index head, and a housing structure that retains EC and/or UT probes, and/or other sensors, such as, but not limited to, a proximity sensor. The adaptor also includes a mechanical or electrical mechanism and/or a proximity sensor that senses and transfers contact information between the integrated probe and the component to be inspected to facilitate preventing a collision between the integrated sensor and component to be inspected. In the exemplary embodiment, CMM system 200 should be able to stop once the integrated probe has a firm contact with the component being inspected. The interface circuit of the adaptor facilitates the transfer of the measurement signal obtained from the sensors through CMM internal cables to the signal receiver or signal trigger, such that the inspection data can be obtained without using additional external cables.

In the exemplary embodiment, UT probe 212 is electrically coupled to a UT receiver 215 in receiving apparatus 206. Receiver 215 is electrically coupled to display 204. Similarly, EC probe 213 is electrically coupled to an eddy current receiver 217 in receiving apparatus 206. In one embodiment, UT probe 212 and/or EC probe 213 are also coupled to a signal digitizer (not shown. CMM 210 is also electrically coupled to display 204. NDE sensors, data receiver 215, and CMM system 200 are connected to a closed-loop, control system (not shown) and to a data processing system (not shown). Accordingly, measurements received by both a CMM probe, UT probe 212, and EC probe 213 and/or the customized inspection probe can be displayed substantially simultaneously on display 204, with or without a CAD model.

During operation, measurement probe 202 is used to inspect blade 100 by receiving measurements from CMM machine 210, UT probe 212, and EC probe 213 substantially simultaneously. During inspection, CMM machine 210 is used to determine a location of UT probe 212 and EC probe 213 in terms of its absolute and relative position with respect to the overall geometry of the component. Substantially simultaneously, UT probe 212 is used to determine a thickness of blade 100 and/or a position of any internal defects within blade 100 by transmitting ultrasonic pulses to UT receiver 215, and EC probe 213 is used to determine the position of surface defects on blade 100 using EC receiver 217. In the exemplary embodiment, the thickness of the blade includes, but is not limited to only including, a wall thickness of the suction side 110 (shown in FIG. 1) and a wall thickness of the pressure side 112 (shown in FIG. 1) of blade 100. Accordingly, in the exemplary embodiment, the thickness and/or position as measured by UT probe 212 is combined with location and dimensional information as determined by CMM system 202. As such, the external boundaries and dimensions of blade 100, the internal boundaries and dimensions of blade 100, and any internal and/or surface defects within blades 100, with or without the CAD model, are displayed in real-time during the inspection process on display 204. In one embodiment, the boundaries, dimensions, and defects, with or without the CAD model of the component inspected are displayed in real-time 3-dimensional imaging.

During operation, system 200 eliminates a need to position a CMM probe within deep and narrow cavities of blade 100. Rather, a cavity geometry may be measured from an external surface of blade 100 using measurement probe 202. Moreover, in the exemplary embodiment, measurement probe 202 is only required to travel along either the pressure side 112 or along the suction side 110 of blade 100 to measure the complete blade geometry on both sides. Accordingly, an amount of time required for the measurement is facilitated to be reduced in comparison to known measurement systems. The measurement of wall thickness of a component with narrow openings can be directly accomplished with a higher accuracy as compared to known systems. Moreover, some NDEs may provide signals that are sensitive to surface normal. Accordingly, the surface normal, as measured by a NDE sensor (such as a laser sensor or proximity sensor), may be used to guide CMM system 200 to enable the normality of other NDE sensors (such as a UT sensor or a EC sensor) to the surface to facilitate accurate measurements with the signal of high S/N ratio, especially when measuring a component with an unknown geometry or defects.

In one embodiment, a method is provided for assembling a measurement device or system 200 for use in measuring a blade, or more generally, a machine component 100. The method includes providing a coordinate measuring device, including a coordinate measuring machine (CMM) 210. The method also includes combining a plurality of NDE capabilities, such as ultrasonic (UT) capabilities 212, proximity sensor (not shown) capabilities, and eddy current (EC) capabilities 213 together with CMM capabilities to form an inspection or measurement probe 202. Inspection or measurement probe 202 is installed on CMM 210 so that inspection probe 202 may measure the external geometry of machine component 100 with the CMM capabilities, and substantially simultaneously measures NDE measurements of the machine component, for example, the internal geometry and internal defects of a part or component (fabricated with any type of material, such as, but not limited to metals, composites, plastics, etc.) with the UT capabilities 212 and/or the surface defects with the EC capabilities 213. In the exemplary embodiment, the measurement probe is coupled to a display 204 to facilitate displaying measurements of machine component 100.

In one embodiment, inspection probe 202 is configured to determine a position of at least one internal defect within the machine component using the UT capabilities 212 and at least one surface defect using the EC capabilities 213. In another embodiment, inspection probe 202 is configured to determine the absolute and relative location of inspection probe 202 with respect to the overall geometry of the component to be inspected, using the CMM capabilities, and/or proximity sensors, and represents the position of the at least one internal defect and the at least one surface defect with the determined location. In one embodiment, inspection probe 202 is configured to measure a geometry of at least two sides of machine component 100 by placing measurement probe 202 in contact with one of the at least two sides. In another embodiment, inspection probe 202 is configured to measure a surface that is substantially normal to machine component 100. In the exemplary embodiment, inspection probe 202 is configured to measure a geometry and internal defects of a rotor blade 100.

The above-described systems and methods facilitate providing a more timely and accurate inspection of both the external and internal structures of a machine component. The above-described systems and methods also facilitate the generation of real-time 3-dimensional imaging, with or without display of a CAD model, and the accurate acquisition of dimensional and defect information of the machine component. Accordingly CMM productivity is improved, especially when measuring complicated geometries. Further, the above-described systems and methods facilitate providing simple probe compensation to each other among the multimodal sensors, including the CMM and a plurality of NDE sensors. The multiple NDE inspection efficiency is facilitated to be improved by conducting multiple inspections at one set up. Accordingly, the CMM has an increased capability of making internal and/or surface dimensional and defect measurements. The data of NDE inspection data are directly linked to geometry information from a CAD model, thus facilitating better inspection data visualization and easier inspection validation by directly comparing the data with the nominal requirements carried on a CAD model.

Although a few specific types of NDE probes have been discussed herein, it will be understood that many types of NDE probes can be used in various embodiments. Examples of other types of suitable NDE probes include, but are not limited to, proximity sensors, x-ray probes, microwave probes, infrared probes, etc.

As used herein, an element or step recited in the singular and proceeded with the word "a" or "an" should be understood as not excluding plural said elements or steps, unless such exclusion is explicitly recited. Furthermore, references to "one embodiment" of the present invention are not intended to be interpreted as excluding the existence of additional embodiments that also incorporate the recited features.

Exemplary embodiments of systems and methods for integrating a measurement probe are described above in detail. The systems and methods illustrated are not limited to the specific embodiments described herein, but rather, components of the system may be utilized independently and separately from other components described herein. Further, steps described in the method may be utilized independently and separately from other steps described herein.

While the invention has been described in terms of various specific embodiments, it will be recognized that the invention can be practiced with modification within the spirit and scope of the claims.

What is claimed is:

1. A measurement device comprising:
    a coordinate measuring machine (CMM); and
    an inspection probe comprising an ultrasound (UT) probe and an eddy current (EC) probe, wherein said inspection probe is integrated with said CMM, such that said CMM is configured to measure one or more external boundaries of a component while substantially simultaneously performing one or more UT and/or EC measurements on the component using respective ones of the UT and/or EC probes,
wherein said measurement device is configured to determine a location and/or an orientation of the inspection probe using the CMM.

2. A measurement device in accordance with claim 1, wherein said measurement device is configured to:
    measure a position of at least one internal defect within the component using the UT probe; and
    measure at least one surface defect on the component using the EC probe.

3. A measurement device in accordance with claim 1, wherein said measurement device is further configured to:
    represent the position of a respective internal defect of the component with a set of determined locations; and
    represent the position of a respective surface defect with a set of determined locations with respect to the geometry of the component.

4. A measurement device in accordance with claim 1, wherein the component comprises a rotor blade.

5. A measurement device in accordance with claim 1, wherein said inspection probe is configured to measure a geometry of at least two sides of the component when placed in contact with only one of the sides.

6. A measurement device in accordance with claim 1, wherein said inspection probe is configured to measure a surface of the component that is substantially normal to the inspection probe.

7. A system for measuring a component, said system comprising:
    a measurement device comprising:
        a coordinate measuring machine (CMM); and
        an inspection probe comprising an ultrasound (UT) probe and an eddy current (EC) probe, wherein said inspection probe is integrated with said CMM, such that the measurement device is configured to measure one or more dimensions of a component using the CMM, while substantially simultaneously performing one or more UT and/or EC measurements on the component using respective ones of the UT and/or EC probes, and wherein said measurement device is further configured to determine one or more locations of the inspection probe using the CMM; and
    a display coupled to said measurement device to display one or more measurements of the component.

8. A system in accordance with claim 7, wherein said measurement device is configured to:
    measure a position of at least one internal defect within the machine component using the UT probe; and
    measure a position of at least one surface defect on the component using the EC probe.

9. A system in accordance with claim 8, wherein said measurement device is further configured to:
    represent a position of a respective internal defect using a set of determined locations; and
    represent a position of a respective surface defect using a set of determined locations.

10. A system in accordance with claim 7, wherein the component comprises a rotor blade.

11. A system in accordance with claim 7, wherein said inspection probe is configured to measure a geometry of at least two sides of the component when placed in contact with only one of the sides.

12. A system in accordance with claim 7, wherein said inspection probe is configured to measure a surface of the component that is substantially normal to the inspection probe.

* * * * *